Figure 1:
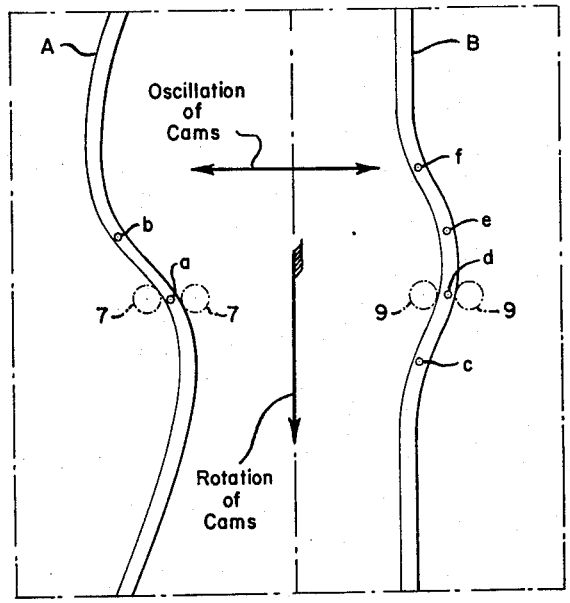

Nov. 15, 1960     R. B. METZNER     2,959,967
MECHANICAL MOTION
Filed Nov. 10, 1958

INVENTOR
Robert B. Metzner

United States Patent Office 2,959,967
Patented Nov. 15, 1960

2,959,967

MECHANICAL MOTION

Robert B. Metzner, Wheeling, W. Va., assignor to Wheeling Steel Corporation, Wheeling, W. Va., a corporation of Delaware Filed Nov. 10, 1958, Ser. No. 773,081

5 Claims. (Cl. 74—56)

This invention relates to a mechanical motion which has many applications but is especially useful in imparting controlled variable oscillation to an oscillatable member. The mechanical motion enables the imparting of controlled oscillation to an oscillatable member and variation of such oscillation as desired within predetermined limits.

As an example of a use to which my mechanical motion may be put, it may be employed in the driving mechanism of a flying shear, press, saw or other flying machine tool. In such a mechanism the operating element (e.g., the shearing head) oscillates back and forth and operates upon the work during each cycle. At the time when the operating element operates upon the work it should be moving forward with the work at constant speed equal to the speed of the work. That is a characteristic of all flying machine tools of the type above mentioned.

Heretofore it has been necessary to change parts or in lieu thereof to employ extremely complex and costly mechanism to adapt a flying machine tool for operating on the work at greater or less intervals along the work. My mechanical motion makes unnecessary the interchanging of machine parts and provides in an extremely simple manner for control of the mechanism so that the work will be acted upon at desired adjusted intervals while the operating element advances at constant speed equal to the speed of the work during each operation upon the work. I find it most practicable to provide for adjustment of the mechanism to operate at different constant speeds or velocities and by use of a suitable variable speed transmission such as a PIV to then synchronize the speed of the flying machine tool to the speed of the work. However, the present application is directed to the mechanical motion per se.

I provide a mechanical motion comprising an oscillatable member, driving means, connections between the driving means and the oscillatable member through which the oscillatable member is oscillated upon operation of the driving means, the connections including a driving member imparting oscillating movement to the oscillatable member, and control means controlling the operation of the driving member whereby the velocity characteristics of the oscillating movement imparted to the oscillatable member are varied as desired within predetermined limits. As indicated above, the advantages of my invention are obtained to an optimum extent when the oscillatable member moves during a predetermined portion of each cycle at uniform velocity, which velocity may be varied as desired within predetermined limits by utilization of my mechanical motion, although it is conceivable that my invention may be employed otherwise than in the oscillation of a member which moves during a predetermined portion of each cycle at uniform velocity.

The connections between the driving means and the oscillatable member through which the oscillatable member is oscillated upon operation of the driving means may include a rotatable and oscillatable driving member imparting oscillating movement to the oscillatable member, and control means may be provided controlling the oscillating movement of the driving member. I may employ a rotatable cam imparting oscillating movement to the oscillatable member and means for oscillating the cam simultaneously with its rotating movement.

I prefer to employ a rotatable cam imparting oscillating movement to the oscillatable member together with means for oscillating the cam simultaneously with its rotating movement and means controlling the last mentioned means whereby the velocity characteristics of the oscillating movement imparted to the oscillatable member are varied as desired within predetermined limits. A first rotatable cam may be utilized which imparts oscillating movement to the oscillatable member, and a second rotatable cam may be used therewith which oscillates the first rotatable cam simultaneously with its rotating movement. The first rotatable cam imparts oscillating movement to the oscillatable member due to its rotation; and the second rotatable cam may be mounted for rotation synchronously with the first rotatable cam. Means may be provided cooperating with the second rotatable cam upon rotation thereof for oscillating the first rotatable cam whereby the oscillation of the oscillatable member is responsive to both the rotation and the oscillation of the first rotatable cam.

I desirably utilize a shaft together with means for rotating the shaft and a cam mounted on the shaft and rotated thereby and by its rotary movement imparting oscillating movement to the oscillatable member, the cam being movable along the shaft while it is rotating, and means for so moving the cam, whereby the oscillation of the oscillatable member is responsive to both the rotation of the cam and its movement along the shaft. A second cam may be mounted on the shaft and connected with the first mentioned cam for rotary movement and movement along the shaft therewith, and means may be provided cooperating with the second cam for oscillating it along the shaft while it is rotating whereby the oscillation of the oscillatable member is responsive to both the rotation of the first mentioned cam and its movement along the shaft. Desirably the last mentioned means is shiftable to alter the phase of the second mentioned cam relative to that of the first mentioned cam.

I also provide a mechanical motion comprising an oscillatable member, two cams rotatable and axially oscillatable in unison, connections between one of the cams and the oscillatable member for oscillating the oscillatable member in response to both the rotation and the oscillation of that cam and means cooperating with the other cam for oscillating it and hence also the first mentioned cam while the cams are rotating. The last mentioned means are preferably shiftable circumferentially of the second mentioned cam to alter the phase of the oscillatory of the oscillatable member imparted to the oscillatable member by the rotation of the cams and the phase of the oscillatory movement of the oscillatable member imparted to the oscillatable member by the oscillation of the cams. The cams are preferably designed so that the oscillatable member moves during a predetermined portion of each cycle at uniform velocity, and preferably such uniform velocity is varied as desired within predetermined limits by circumferential shifting of the circumferentially shiftable means.

Other details, objects and advantages of the invention will become apparent as the following description of a present preferred embodiment thereof proceeds.

Figure 2:
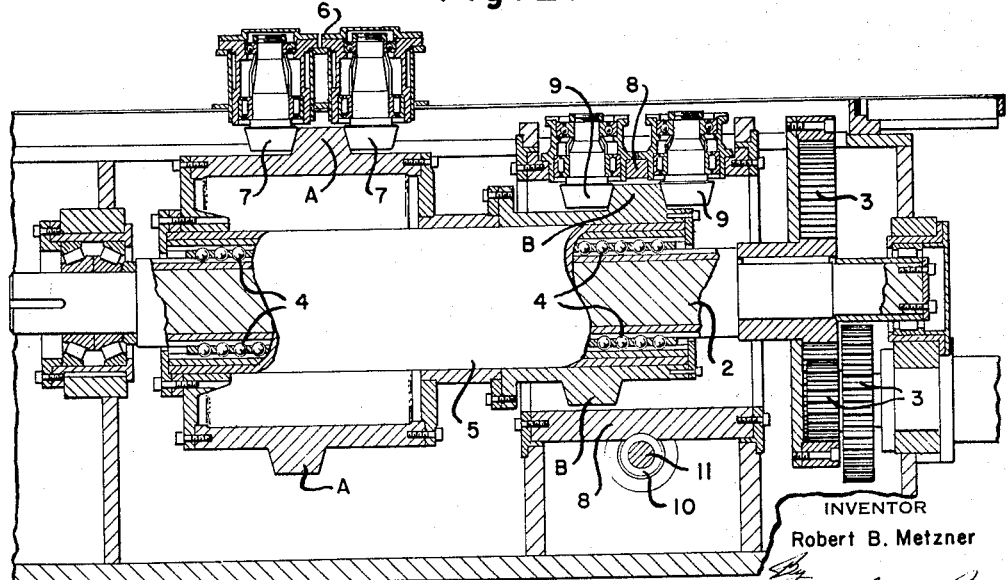

In the accompanying drawings I have shown a present preferred embodiment of the invention in which:

Figure 1 is a development of the contours of cams which may be employed in my mechanical motion; and Figure 2 is an axial cross-sectional view through a mechanical motion.

Referring first to Figure 1, that figure shows in development the contours of two cams which are rotatable and axially oscillatable in unison and the effective portions or phases of which are adapted to be relatively circumferentially adjusted. The two cams cooperate to impart oscillatory movement to an oscillatable member whose oscillation is responsive to both the rotation of the cams and their oscillation. The cams may be considered as rotating about an axis extending horizontally across Figure 1 and also as oscillating along that axis.

The left-hand cam viewing Figure 1 is designated A and the right-hand cam is designated B. The portion of cam A which contributes to the controlled movement of the oscillatable member extends from point $a$ to point $b$. Cam B is designed so that any part thereof along the portion $c$—$d$—$e$—$f$ may become operative simultaneously or coact with the portion $a$—$b$ of cam A to cooperate therewith in effecting the controlled movement of the oscillatable member, the contours of the two cams when designed as shown in Figure 1 being such that the resultant movement along the axis and hence the controlled movement of the oscillatable member during that part of its oscillatory movement which is controlled by the above mentioned portions of the two cams is a constant speed movement. This is true only when the portion $a$—$b$ of the cam A coacts or operates simultaneously with any segment of the portion $c$—$d$—$e$—$f$ of the cam B. Circumferential adjustment either of the cam B or of the follower which follows that cam and contributes to imparting movement to the oscillatable member always results in constant speed motion of the oscillatable member along the axis of the cams so long as some segment of the portion $c$—$d$—$e$—$f$ of the cam B is operative simultaneously with the portion $a$—$b$ of the cam A. However, the constant speed thus imparted to the controlled portion of the movement of the oscillatable member axially of the cams varies depending upon which segment of the portion $c$—$d$—$e$—$f$ of the cam B cooperates or is operative simultaneously with the portion $a$—$b$ of the cam A. The highest velocity is obtained when the segment $c$—$d$ of the cam B cooperates with the portion $a$—$b$ of the cam A and the lowest velocity when the segment $e$—$f$ of the cam B coacts with the portion $a$—$b$ of the cam A. An intermediate velocity results when the portion $d$—$e$ of the cam B coacts with the portion $a$—$b$ of the cam A, the cams being shown in that relationship in the diagrammatic illustration of Figure 1.

Thus by appropriate relative control of the cams they drive an oscillatable member so that during a predetermined portion of its oscillating movement it moves at constant speed and that speed may be controlled without replacing machine parts and without employing complex and costly mechanism. In order to synchronize the speed of the oscillatable member with that of the work the variable speed transmission through which the oscillatable member is driven is adjusted to bring the speed of the oscillatable member during the constant speed portion of its stroke to the speed of advance of the work, but such adjustment results in increase or decrease of the spacing along the work of the operations performed thereon by the flying machine tool, wherefore my mechanical motion has great utility and value.

Referring now more particularly to Figure 2, there is shown a shaft 2 driven through gearing 3 by any suitable source of power. Mounted on the shaft 2 to be rotated therewith when the shaft 2 rotates but movable longitudinally of the shaft is an element 5 of which the cam A and the cam B are integral parts. Ball bearing devices 4 spaced about the shaft 2 serve the dual function of keying or splining the element 5 to the shaft and providing for anti-friction movement of the element 5 along the shaft. The cams A and B may be the same cams A and B whose partial contours are shown in development in Figure 1. As above indicated the cams A and B rotate together and also move together axially of the shaft 2. A follower designated generally by reference numeral 6 may be, or may be directly connected to, the oscillatable member above referred to. It is mounted in guides not shown parallel to the axis of the shaft 2 and is moved back and forth in those guides by the cam A. The follower 6 has cam following rollers 7 engaging the cam A at opposite faces as shown in Figure 2.

Surrounding the cam B is a ring 8 having cam following rollers 9 which engage the cam B at opposite faces as shown in Figure 2. The ring 8 is shiftable or adjustable circumferentially about the cam B so that the rollers 9 engage the cam B at a selected portion or segment of the cam while the rollers 7 engage the cam A at a certain portion of that cam. By circumferential adjustment of the ring 8 the coacting portions of the cams A and B can be correlated as above explained in connection with Figure 1.

In operation of my mechanical motion the shaft 2 is driven as above explained and the ring 8 is disposed in desired adjusted position circumferentially of the cam B. Since the element 5 carrying both the cam A and the cam B must rotate with the shaft the rollers 9 carried by the ring 8 cause the element 5 to oscillate axially of the shaft. At the same time the cam A is by its rotation causing the follower 6 to oscillate parallel to the axis of the shaft 2, but the oscillation of the follower 6 is responsive not only to the rotation of the cam A but also to the oscillation of that cam parallel to the axis of the shaft 2 which is caused by the engagement of the rollers 9 with the cam B as the shaft 2 and the element 5 rotate. The net effect with the cams designed as shown in Figure 1 and above explained is that the follower 6 oscillates back and forth in its path but with a constant speed portion of its movement when it is moving toward the left viewing Figure 2. The velocity of that constant speed portion of the movement of the follower 6 is adjusted by turning the ring 8 to alter the position of the rollers 9 relatively to the cam B. The portions of the cams A and B which act cooperatively at any instant to move the follower 6 are the portions engaged respectively by the rollers 7 and the rollers 9.

As explained above, the velocity of movement of the follower 6 toward the left during the constant speed portion of its movement is fastest when the segment $c$—$d$ of the cam B is effective contemporaneously or coacts with the portion $a$—$b$ of the cam A. The velocity of the follower 6 during the constant speed portion of its movement is slowest when the segment $e$—$f$ of the cam B is effective contemporaneously with the portion $a$—$b$ of the cam A, and the velocity of the follower 6 during the constant speed portion of its movement is at an intermediate value when the segment $d$—$e$ of the cam B is effective contemporaneously with the portion $a$—$b$ of the cam A. The adjustment of the velocity of movement of the follower 6 during the constant speed portion of its movement is made solely by turning of the ring 8, which may be accomplished by a worm 10 fixed to a cross shaft 11 which may be provided with a handle or hand wheel. The ring 8 may have a peripheral gear meshing with the worm 10.

While the cams herein disclosed are designed to impart to the follower 6 a motion having a constant speed portion my invention is not so limited and may be employed in any situation in which two cams employed cooperatively may be used to control the oscillation of an oscillatable member with adjustment as herein disclosed by circumferential movement of one of the cams or the follower which it operates.

While I have shown and described a present preferred embodiment of the invention it is to be distinctly understood that the invention is not limited thereto but may be

I claim:

1. A mechanical motion comprising guide means, a non-rotating oscillatable member guided for oscillating movement by said guide means, driving means, connections between the driving means and the oscillatable member through which the oscillatable member is oscillated upon operation of the driving means, the connections including a rotatable driving member imparting oscillating movement to the oscillatable member, and control means mounted to engage a portion of the rotatable driving member as such member rotates controlling the operation of the driving member, means mounting at least one of the control means and said portion of the rotatable driving member for circumferential shifting about the axis of the rotatable driving member to predetermined positions whereby the velocity characteristics of the oscillating movement imparted to the oscillatable member are varied as desired in accordance with the relative positioning of the control means and said portion of the rotatable member within predetermined limits and means maintaining the control means and said portion of the rotatable driving member in desired predetermined relative position.

2. A mechanical motion comprising an oscillatable member, driving means, connections between the driving means and the oscillatable member through which the oscillatable member is oscillated upon operation of the driving means, the connections including a rotatable driving member imparting oscillating movement to the oscillatable member, and control means mounted to engage a portion of the rotatable driving member as such member rotates controlling the operation of the driving member, means mounting at least one of the control means and said portion of the rotatable driving member for circumferential shifting about the axis of the rotatable driving member to predetermined positions whereby the oscillatable member moves during a predetermined portion of each cycle at uniform velocity which is varied as desired in accordance with the relative positioning of the control means and said portion of the rotatable member within predetermined limits and during the remainder of each cycle at non-uniform velocity and means maintaining the control means and said portion of the rotatable driving member in desired predetermined relative position.

3. A mechanical motion comprising an oscillatable member, driving means, connections between the driving means and the oscillatable member through which the oscillatable member is oscillated upon operation of the driving means, the connections including a shaft, means for rotating the shaft and a cam mounted on the shaft and rotated thereby and by its rotary movement imparting oscillating movement to the oscillatable member, the cam being movable along the shaft while it is rotating, another cam mounted on the shaft and connected with the first mentioned cam for rotary movement and movement along the shaft therewith, means cooperating with the second mentioned cam for oscillating it along the shaft while it is rotating whereby the oscillation of the oscillatable member is responsive to both the rotation of the first mentioned cam and its movement along the shaft, means mounting at least one of the last mentioned means and the second mentioned cam for shifting relative to the other thereof to alter the phase of said last mentioned means relative to that of the second mentioned cam and means maintaining said last mentioned means and the second mentioned cam in desired relative position.

4. A mechanical motion comprising an oscillatable member, two cams rotatable and axially oscillatable in unison, connections between one of the cams and the oscillatable member for oscillating the oscillatable member in response to both the rotation and the oscillation of that cam, means cooperating with the other cam for oscillating it and hence also the first mentioned cam while the cams are rotating, means mounting the last mentioned means for shifting circumferentially of the second mentioned cam to alter the phase of the oscillatory movement of the oscillatable member imparted to the oscillatable member by the rotation of the cams and the phase of the oscillatory movement of the oscillatable member imparted to the oscillatable member by the oscillation of the cams and means maintaining said last mentioned means in desired adjusted position.

5. A mechanical motion comprising an oscillatable member, two cams rotatable and axially oscillatable in unison, connections between one of the cams and the oscillatable member for oscillating the oscillatable member in response to both the rotation and the oscillation of that cam, means cooperating with the other cam for oscillating it and hence also the first mentioned cam while the cams are rotating, means mounting the last mentioned means for shifting circumferentially of the second mentioned cam to alter the phase of the oscillatory movement of the oscillatable member imparted to the oscillatable member by the rotation of the cams and the phase of the oscillatory movement of the oscillatable member imparted to the oscillatable member by the oscillation of the cams, the cams being designed so that the oscillatable member moves during a predetermined portion of each cycle at uniform velocity which is varied as desired within predetermined limits by circumferential shifting of said last mentioned means, and means maintaining said last mentioned means in desired adjusted position.

References Cited in the file of this patent

UNITED STATES PATENTS

| | | |
|---|---|---|
| 974,694 | Myer | Nov. 1, 1910 |
| 1,464,925 | Dudley | Aug. 14, 1923 |
| 1,490,656 | Bignan | Apr. 15, 1924 |
| 2,493,420 | Ranney et al. | Jan. 3, 1950 |
| 2,567,576 | Palumbo | Sept. 11, 1951 |
| 2,700,335 | Stobb | Jan. 25, 1955 |

OTHER REFERENCES

Publication: Cams—Elementary and Advanced, 1st ed., 1921, by F. D. Furman, published by John Wiley and Sons, Inc., New York, N.Y., pages 72–74 inclusive and 186–188 inclusive.

UNITED STATES PATENT OFFICE
CERTIFICATION OF CORRECTION

Patent No. 2,959,967 November 15, 1960

Robert B. Metzner

It is hereby certified that error appears in the above numbered patent requiring correction and that the said Letters Patent should read as corrected below.

Column 1, line 33, after "change" insert -- machine --.

Signed and sealed this 9th day of May 1961.

(SEAL)
Attest:

ERNEST W. SWIDER
Attesting Officer

DAVID L. LADD
Commissioner of Patents